United States Patent
Lee

(10) Patent No.: US 10,450,415 B2
(45) Date of Patent: Oct. 22, 2019

(54) POLYAMIDE COMPOUND, AND METHOD FOR PRODUCING SAME

(71) Applicant: TOYOTA BOSHOKU KABUSHIKI KAISHA, Aichi (JP)

(72) Inventor: Chihan Lee, Aichi (JP)

(73) Assignee: TOYOTA BOSHOKU KABUSHIKI KAISHA, Aichi (JP)

(*) Notice: Subject to any disclaimer, the term of this patent is extended or adjusted under 35 U.S.C. 154(b) by 169 days.

(21) Appl. No.: 15/742,383

(22) PCT Filed: Jun. 17, 2016

(86) PCT No.: PCT/JP2016/068091
§ 371 (c)(1),
(2) Date: Jan. 5, 2018

(87) PCT Pub. No.: WO2017/006748
PCT Pub. Date: Jan. 12, 2017

(65) Prior Publication Data
US 2018/0127544 A1    May 10, 2018

(30) Foreign Application Priority Data
Jul. 6, 2015 (JP) ................................ 2015-134897

(51) Int. Cl.
*C08G 69/26* (2006.01)
*C08G 69/42* (2006.01)
(Continued)

(52) U.S. Cl.
CPC ........... *C08G 69/26* (2013.01); *C08G 69/265* (2013.01); *C08G 69/34* (2013.01); *C08G 69/40* (2013.01); *C08G 69/42* (2013.01)

(58) Field of Classification Search
None
See application file for complete search history.

(56) References Cited

U.S. PATENT DOCUMENTS 4,795,781 A * 1/1989 Miyamoto ............ C08L 29/04
525/183

5,177,177 A    1/1993 Thullen et al.
(Continued)

FOREIGN PATENT DOCUMENTS

JP    S59-49229 A    3/1984
JP    H4-253727 A    9/1992
(Continued)

OTHER PUBLICATIONS

S. Chatti et al., "Efficient synthesis of polyethers from isosorbide by microwave-assisted phase transfer catalysis", European Polymer Journal, 38, 2002, pp. 1851-1861.
(Continued)

*Primary Examiner* — Peter A Salamon
(74) *Attorney, Agent, or Firm* — Greenblum & Bernstein, P.L.C.

(57) ABSTRACT

To provide a polyamide compound having better properties than conventional polyamide compounds.
A polyamide compound comprising a dicarboxylic acid unit represented by the following general formula (1) and a diamine unit represented by the following general formula (2). The polyamide compound of the present invention is characterized by having high energy absorption and high water-absorption resistance rate, and being amorphous (transparent).

[Chemical Formula 1]

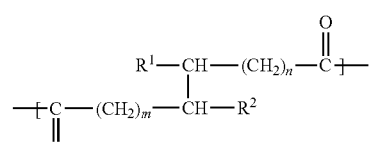

(1)

[Chemical Formula 2]

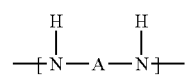

(2)

7 Claims, 3 Drawing Sheets

(51) Int. Cl.
*C08G 69/34* (2006.01)
*C08G 69/40* (2006.01)

(56) References Cited

U.S. PATENT DOCUMENTS

| | | | |
|---|---|---|---|
| 5,849,376 A * | 12/1998 | Oishi | B32B 27/32 428/34.9 |
| 6,224,788 B1 * | 5/2001 | Ogawa | G02F 1/133723 252/299.4 |
| 2009/0143534 A1 * | 6/2009 | Kawamura | B29B 9/12 525/178 |
| 2010/0092879 A1 * | 4/2010 | Minegishi | C08G 69/26 430/18 |
| 2011/0105697 A1 | 5/2011 | Buhler et al. | |
| 2013/0267718 A1 | 10/2013 | Chopra et al. | |
| 2014/0073720 A1 * | 3/2014 | Geismann | C08K 5/544 523/435 |
| 2015/0119487 A1 * | 4/2015 | Vanbesien | C09D 11/023 522/18 |
| 2017/0158817 A1 * | 6/2017 | Ogiwara | C08G 69/26 |
| 2018/0127544 A1 * | 5/2018 | Lee | C08G 69/42 |

FOREIGN PATENT DOCUMENTS

| | | |
|---|---|---|
| JP | H9-12716 A | 1/1997 |
| JP | 2009-275216 A | 11/2009 |
| JP | 2011-525558 A | 9/2011 |
| JP | 2012-22228 A | 2/2012 |
| JP | 201222228 A * | 2/2012 |
| JP | 2012-184372 A | 9/2012 |
| JP | 2013-216653 A | 10/2013 |
| JP | 2015-86396 A | 5/2015 |

OTHER PUBLICATIONS

S. Chatti et al., "Copolycarbonates of Isosorbide and Various Diols", Polym. Chem., 44, 2006, pp. 3616-3628.

Lee et al., "Improving the Machanical Properties of Isosorbide Copolycarbonates by Varying the Ratio of Comonomers", J. Appl. Polym. Sci., 127, 2013, pp. 530-534.

International Search Report from Application No. PCT/JP2016/068091, dated Sep. 13, 2016.

* cited by examiner

POLYAMIDE COMPOUND, AND METHOD FOR PRODUCING SAME

TECHNICAL FIELD

The present invention relates to a polyamide compound and a method for producing the same. In particular, the present invention relates to a polyamide compound having excellent resistance to water absorption and the like, and a production method thereof.

BACKGROUND ART

From the viewpoint of global warming prevention and resource risk reduction, polymers that use plant-derived compounds as starting materials have attracted attention instead of petroleum-based polymers (see, for example, Non-Patent Literatures 1 to 3).

Polylactic acid as a representative example thereof is a plant-derived compound, but has problems with heat resistance and resistance to hydrolysis. Accordingly, only with polylactic acid, the application range is limited. For example, due to the characteristics of polylactic acid, there are automotive parts and the like in which polylactic acid cannot be applied.

Under such circumstances, development of plant-derived high-performance polymers other than polylactic acid is desired.

As polyamide compounds, PA6 obtained by polymerizing ε-caprolactam, PA66, PA610, PA1010 obtained by polymerizing dicarboxylic acid and diamine, and the like are conventionally known. In addition, PA11 which is a plant-derived polyamide compound is obtained by polymerization of 11-aminoundecanoic acid.

However, there have been cases where the conventional polyamide compounds obtained by polymerization of ε-caprolactam, dicarboxylic acid and diamine, 11-aminoundecane fail to provide sufficient characteristics. For example, there have been cases where it has characteristics to be improved such as lack of flexibility, high water absorption rate, low energy absorption properties, and being a crystalline resin.

CITATIONS LIST

Non Patent Literature

Non Patent Literature 1: S. Chatti, M. Bortolussi, A. Loupy, J. C. Blais, D. Bogdal, M. Majdoub. Eur. Polym. J. 38, 1851 (2002).
Non Patent Literature 2: S. Chatti, H. R. Kricheldorf. G. Schwarz. J. Polym. Sci. Part A: Polym. Chem. 44, 3616 (2006).
Non Patent Literature 3: C.-H. Lee, H. Takagi, H. Okamoto, M. Kato. J. Appl. Polym. Sci. 127, 530 (2013).

SUMMARY OF INVENTION

Technical Problems

The present invention has been made in view of the above circumstances, and an object thereof is to provide a polyamide compound having better characteristics than conventional polyamide compounds.

Solutions to Problems

The present inventors have intensively studied in view of the above conventional techniques, and as a result, have developed a novel polyamide compound.

Moreover, the present inventors have found an unexpected fact that this novel polyamide compound has excellent characteristics not seen in conventional polyamide compounds. The present invention has been made based on this finding.

That is, a first aspect of the invention provides a polyamide compound comprising a dicarboxylic acid unit represented by the following general formula (1) and a diamine unit represented by the following general formula (2).

[Chemical Formula 1]

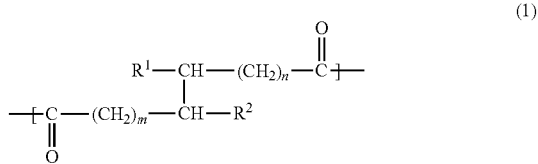

(wherein n represents 11, and m represents 11; $R^1$ represents $n\text{-}C_9H_{19}$; and $R^2$ represents $n\text{-}C_9H_{19}$)

[Chemical Formula 2]

(wherein A represents a divalent organic group selected from the following group.)

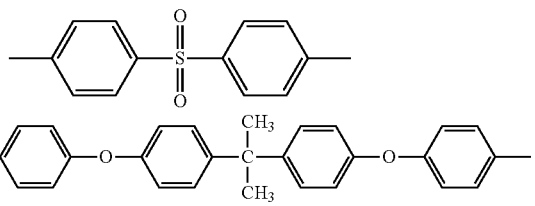

A second aspect of the invention provides the polyamide compound according to the first aspect, further comprising a diamine unit represented by the following general formula (3).

[Chemical Formula 3]

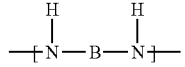

(wherein B represents a divalent organic group selected from the following group, with the proviso that A and B are different.)

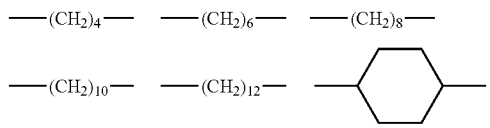

-continued

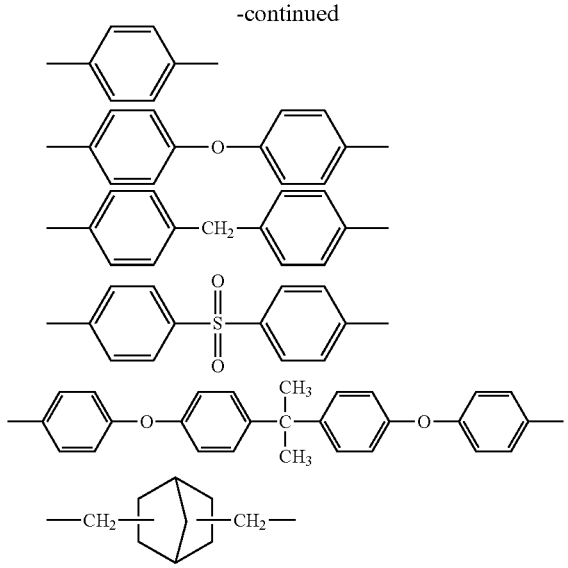

A fourth aspect of the invention provides the polyamide compound according to the first or second aspect, wherein A is the following divalent organic group.

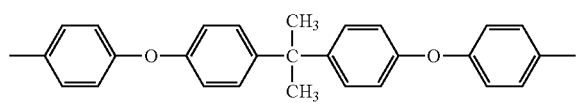

A fifth aspect of the invention provides a method for producing the polyamide compound as defined in any one of the first to fourth aspects, comprising reacting a dicarboxylic acid compound having a structure represented by the following general formula (4) with a diamine compound.

[Chemical Formula 4]

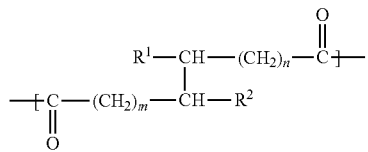
(4)

(wherein n represents 11, and m represents 11; $R^1$ represents n-$C_9H_{19}$; and $R^2$ represents n-$C_9H_{19}$.)

Advantageous Effects of Invention

The polyamide compound of the present invention has a long chain, thus has excellent resistance to water absorption.

In addition, according to the method for producing the polyamide compound of the present invention, a polyamide compound having excellent resistance to water absorption can be produced.

BRIEF DESCRIPTION OF DRAWINGS

The present invention is further described in the detailed description which follows, in reference to the noted plurality of drawings by way of non-limiting examples of exemplary embodiments of the present invention.

DESCRIPTION OF EMBODIMENTS

Figure 1:
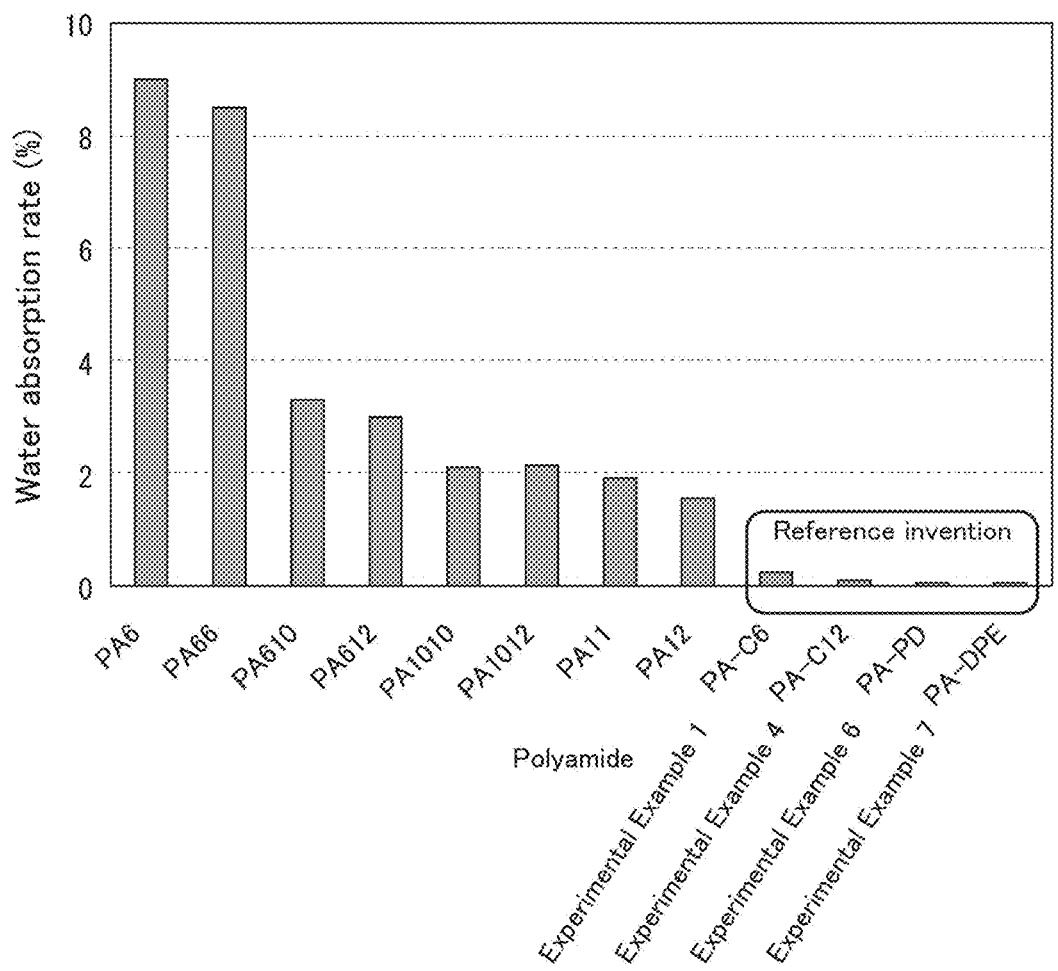
FIG. 1 is a graph comparatively showing water absorption rates of a conventional polyamide compound and a polyamide compound of the experimental example.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Hereinafter, the present invention will be described in detail.

[1] Polyamide Compound

The polyamide compound of the present invention contains a dicarboxylic acid unit represented by the following general formula (1) and a diamine unit represented by the following general formula (2).

[Chemical Formula 5]

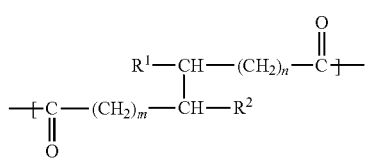
(1)

(wherein n represents 11, and m represents 11; $R^1$ represents n-$C_9H_{19}$, and $R^2$ represents n-$C_9H_{19}$)

[Chemical Formula 6]

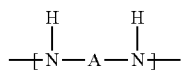
(2)

(wherein A represents a divalent organic group selected from the following group).

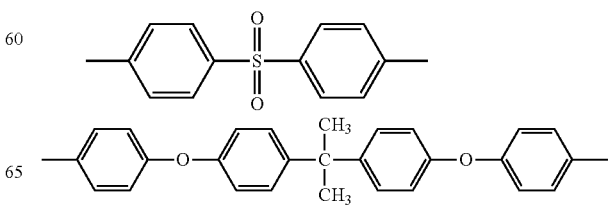

The polyamide compound of the present invention may further contain a structural unit other than the above as long as the effect of the present invention is not impaired.

In the polyamide compound of the present invention, the content of the dicarboxylic acid unit is not particularly limited. The content of the dicarboxylic acid unit is usually 5 to 50% by mol, preferably 20 to 50% by mol, and further preferably 30 to 50% by mol.

In the polyamide compound of the present invention, the content of the diamine unit is not particularly limited. The content of the diamine unit is usually 5 to 50% by mol, preferably 20 to 50% by mol, and further preferably 30 to 50% by mol.

It is preferable that the ratio of the content of the dicarboxylic acid unit to the content of the diamine unit is substantially the same from the viewpoint of the polymerization reaction, and it is more preferable that the content of the dicarboxylic acid unit is ±1% by mol of the content of the diamine unit.

[1-1] Dicarboxylic Acid Unit

The polyamide compound of the present invention contains a dicarboxylic acid unit represented by the following general formula (1) as described above.

[Chemical Formula 7]

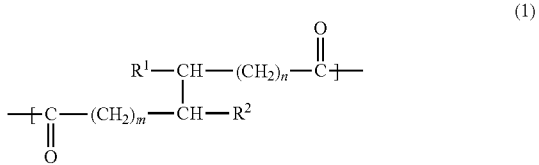

(1)

(wherein n represents 11, and m represents 11; $R^1$ represents n-$C_9H_{19}$, and $R^2$ represents n-$C_9H_{19}$);

As the dicarboxylic acid unit, n is 11 in the present invention. Moreover, m is 11. This is because when n and m are within these ranges, the content ratio of hydrogen bonds in the molecule decreases, and water resistance improves.

In particular, one in which n and m are the same is preferable.

In the present invention, the dicarboxylic acid unit has the unit represented by the following formula (5). The unit represented by the formula (5) is derived from plants, thus is preferable from the viewpoint of global warming prevention and resource risk reduction.

[Chemical Formula 8]

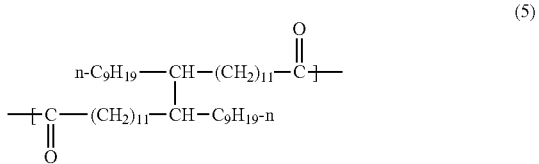

(5)

When the total of the dicarboxylic acid units in the polyamide compound of the present invention is taken as 100% by mol, the content of the dicarboxylic acid unit represented by the above general formula (1) is not particularly limited. The dicarboxylic acid unit represented by the general formula (1) is contained in an amount of preferably 30 to 100% by mol, more preferably 50 to 100% by mol, and particularly preferably 70 to 100% by mol. This is because when the content of the dicarboxylic acid unit represented by the general formula (1) is within this range, resistance to water absorption is excellent.

The compound capable of constituting a dicarboxylic acid unit other than the dicarboxylic acid unit represented by the general formula (1) is not particularly limited.

Specific examples of the dicarboxylic acid compound include linear aliphatic dicarboxylic acids having 2 to 25 carbon atoms such as oxalic acid, malonic acid, fumaric acid, maleic acid, succinic acid, glutaric acid, adipic acid, pimelic acid, suberic acid, azelaic acid, sebacic acid and dodecanedioic acid, or aliphatic dicarboxylic acids such as dimerized aliphatic dicarboxylic acids (dimer acids) having 14 to 48 carbon atoms obtained by dimerizing an unsaturated fatty acid obtained by fractional distillation of a triglyceride, and hydrogenated products thereof (hydrogenated dimer acids); alicyclic dicarboxylic acids such as 1,4-cyclohexanedicarboxylic acid; and aromatic dicarboxylic acids such as terephthalic acid, isophthalic acid, 1,3-benzenediacetic acid and 1,4-benzenediacetic acid. Also, derivatives of these dicarboxylic acid compounds may be used. Examples of the derivatives include carboxylic acid halides and the like. These can be used singly or in combination of two or more kinds.

When the total of the dicarboxylic acid units in the polyamide compound of the present invention is taken as 100% by mol, the content of the dicarboxylic acid unit other than the dicarboxylic acid represented by the above general formula (1) is not particularly limited. The content of the dicarboxylic acid unit other than the dicarboxylic acid represented by the general formula (1) is preferably less than 50% by mol, further preferably less than 20% by mol, and particularly preferably less than 10% by mol. This is because when the content of the dicarboxylic acid unit other than the dicarboxylic acid unit represented by the general formula (1) is within this range, resistance to water absorption is improved.

[1-2] Diamine Unit

The diamine unit in the polyamide compound of the present invention contains at least a diamine unit represented by the general formula (2).

[Chemical Formula 9]

(2)

(wherein A represents a divalent organic group selected from the following group).

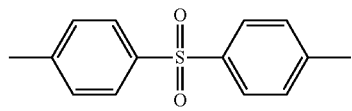

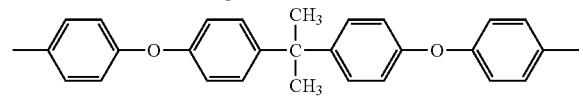

The divalent organic group is a divalent organic group having 2 or 4 aromatic rings. This is because a polyamide compound having a diamine unit having a divalent organic group tends to have a high impact absorption rate.

Specific examples of the divalent organic group are the organic groups shown below.

[Chemical Formula 10]

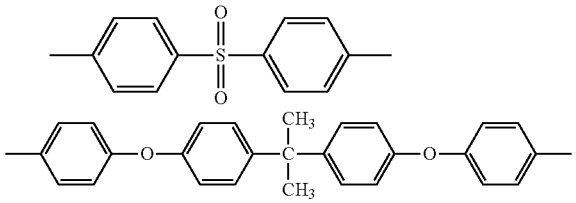

As the compound capable of constituting the diamine unit, the diamine shown below is preferably exemplified.

[Chemical Formula 11]

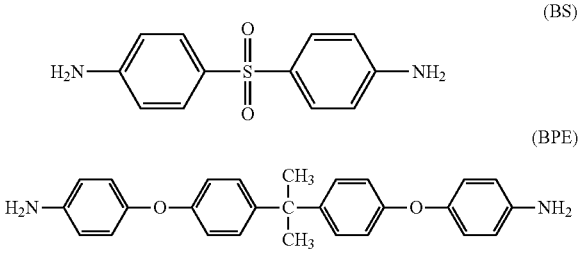

When the total of the diamine units in the polyamide compound of the present invention is taken as 100% by mol, the content of the diamine unit represented by the above general formula (2) is not particularly limited. The diamine unit represented by the general formula (2) is contained in an amount of preferably 5 to 100% by mol, more preferably 20 to 100% by mol, and particularly preferably 30 to 100% by mol. This is because when the content of the diamine unit represented by the general formula (2) is within this range, resistance to water absorption is excellent.

The diamine unit in the polyamide compound of the present invention may contain, in addition to the diamine unit represented by the above general formula (2), a diamine unit represented by the general formula (3).

[Chemical Formula 12]

$$-\!\!\left[\!\!\begin{array}{c}H\\|\\N\end{array}\!\!-\!\!B\!\!-\!\!\begin{array}{c}H\\|\\N\end{array}\!\!\right]\!\!-$$ (3)

(wherein B represents a divalent organic group selected from the following group, with the proviso that A and B are different.)

—(CH$_2$)$_4$—   —(CH$_2$)$_6$—   —(CH$_2$)$_8$—

—(CH$_2$)$_{10}$—   —(CH$_2$)$_{12}$—   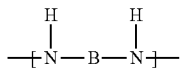

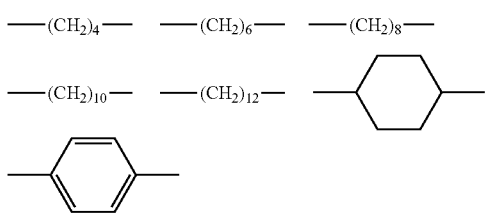

-continued

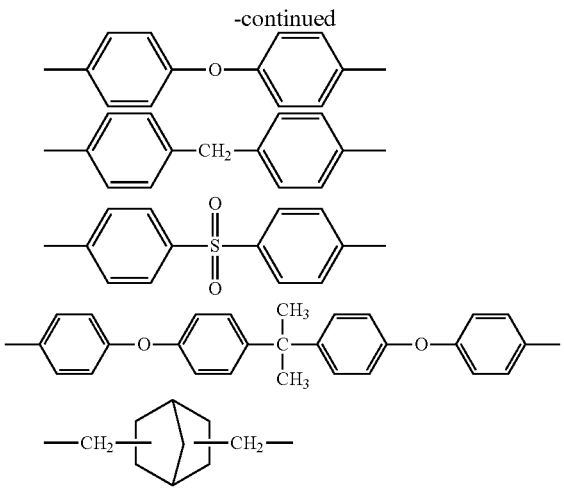

The polyamide compound contains the diamine unit represented by the general formula (3), in addition to the diamine unit represented by the general formula (2), whereby various characteristics can be imparted.

Examples of preferable combinations of a compound capable of constituting the diamine unit represented by the general formula (2) and a compound capable of constituting the diamine unit represented by the general formula (3) include the following combinations.

[Chemical Formula 16]

(M-4)

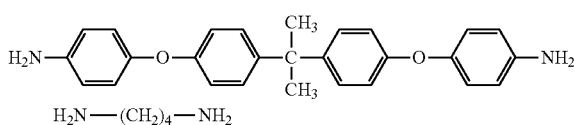

H$_2$N—(CH$_2$)$_4$—NH$_2$

[Chemical Formula 17]

(M-5)

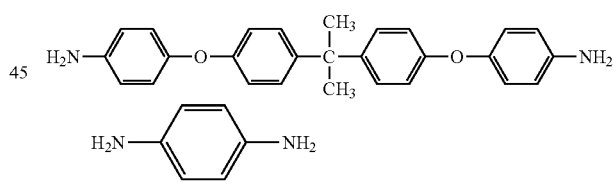

[Chemical Formula 18]

(M-6)

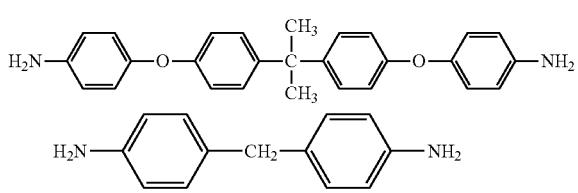

When the diamine unit represented by the general formula (3) is contained in addition to the diamine unit represented by the general formula (2), the total of the diamine unit represented by the general formula (2) and the diamine unit represented by the general formula (3) is contained in an amount of preferably 50 to 100% by mol, more preferably 60 to 100% by mol, and particularly preferably 70 to 100% by mol, in the total of 100% by mol of the diamine units in the polyamide compound. This is because when it is within this range, resistance to water absorption is excellent.

When the diamine unit represented by the general formula (3) is contained in addition to the diamine unit represented by the general formula (2), the molar ratio of the diamine unit represented by the general formula (2): the diamine unit represented by the general formula (3) is preferably 1:0.01 to 1:100, more preferably 1:0.1 to 1:10, and further preferably 1:0.3 to 1:3.

In the polyamide compound containing the diamine unit represented by the general formula (3) in addition to the diamine unit represented by the general formula (2), a repeating unit consisting of the dicarboxylic acid unit represented by the general formula (1) and the diamine unit represented by the general formula (2) and a repeating unit consisting of the dicarboxylic acid unit represented by the general formula (1) and the diamine unit represented by the general formula (3) may be randomly present in the polyamide compound.

Also, the repeating unit consisting of the dicarboxylic acid unit represented by the general formula (1) and the diamine unit represented by the general formula (2) and the repeating unit consisting of the dicarboxylic acid unit represented by the general formula (1) and the diamine unit represented by the general formula (3) may be each formed in block form and present in the polyamide compound. That is, in the case of this block form, a block in which only the repeating units consisting of the dicarboxylic acid unit represented by the general formula (1) and the diamine unit represented by the general formula (2) are gathered, and a block in which only the repeating units consisting of the dicarboxylic acid unit represented by the general formula (1) and the diamine unit represented by the general formula (3) are gathered are present. Moreover, the polyamide compound having these blocks has both properties of the polyamide compound comprising only the repeating units consisting of the dicarboxylic acid unit represented by the general formula (1) and the diamine unit represented by the general formula (2) and properties of the polyamide compound comprising only the repeating units consisting of the dicarboxylic acid unit represented by the general formula (1) and the diamine unit represented by the general formula (3).

The compound capable of constituting a diamine unit other than the diamine units represented by the general formulae (2) (3) is not particularly limited.

Examples of the diamine other than the diamine units represented by the general formulae (2) (3) include known aliphatic diamines, alicyclic diamines, aromatic diamines, diaminoorganosiloxanes, and the like.

Examples of the aliphatic diamine capable of constituting a diamine unit other than the diamine units represented by the general formulae (2) (3) include 1,1-metaxylylenediamine, 1,3-propanediamine, pentamethylenediamine, and the like.

Examples of the alicyclic diamine include 4,4'-methylenebis(cyclohexylamine), 1,3-bis(aminomethyl)cyclohexane, and the like.

Examples of the aromatic diamine include o-phenylenediamine, m-phenylenediamine, 4,4'-diaminodiphenylmethane, 1,5-diaminonaphthalene, 2,2'-dimethyl-4,4'-diaminobiphenyl, 4,4'-diamino-2,2'-bis(trifluoromethyl)biphenyl, 2,7-diaminofluorene, 4,4'-diamino-2,2'-dimethylbiphenyl, 9,9-bis(4-aminophenyl)fluorene, 2,2-bis[4-(4-aminophenoxy)phenyl]hexafluoropropane, 2,2-bis(4-aminophenyl)hexafluoropropane, 4,4'-(p-phenylenediisopropylidene)bisaniline, 4,4'-(m-phenylenediisopropylidene)bisaniline, 1,4-bis(4-aminophenoxy)benzene, 4,4'-bis(4-amninophenoxy)biphenyl, 2,6-diaminopyridine, 3,4-diaminopyridinte, 2,4-diaminopyrimidine, 3,6-diaminoacridine, 3,6-diaminocarbazole, N-methyl-3,6-diaminocarbazole, N-ethyl-3,6-diaminocarbazole, N-phenyl-3,6-diaminocarbazole, N,N'-bis(4-aminophenyl)-benzidine, N,N'-bis(4-aminophenyl)-N,N'-dimethylbenzidine. 1,4-bis(4-aminophenyl)-piperazine, 3,5-diaminobenzoic acid, dodecanoxy-2,4-diaminobenzene, tetradecanoxy-2,4-diaminobenzene, pentadecanoxy-2,4-diaminobenzene, hexadecanoxy-2,4-diaminobenzene, octadecanoxy-2,4-diaminobenzene, dodecanoxy-2,5-diaminobenzene, tetradecanoxy-2,5-diaminobenzene, pentadecanoxy-2,5-diaminobenzene, hexadecanoxy-2,5-diaminobenzene, octadecanoxy-2,5-diaminobenzene, cholestanyloxy-3,5-diaminobenzene, cholestenyloxy-3,5-diaminobenzene, cholestanyloxy-2,4-diaminobenzene, cholestenyloxy-2,4-diaminobenzene, cholestanyl 3,5-diaminobenzoate, cholestenyl 3,5-diaminobenzoate, lanostanyl 3,5-diaminobenzoate, 3,6-bis(4-aminobenzoyloxy)cholestane, 3,6-bis(4-aminophenoxy)cholestane, 4-(4'-trifluoromethoxybenzoyloxy)cyclohexyl-3,5-diaminobenzoate, 4-(4'-trifluoromethylbenzoyloxy)cyclohexyl-3,5-diaminobenzoate, 1,1-bis(4-((aminophenyl)methyl)phenyl)-4-butylcyclohexane, 1,1-bis(4-((aminophenyl)methyl)phenyl)-4-heptylcyclohexane, 1,1-bis(4-((aminophenoxy)methyl)phenyl)-4-heptylcyclohexane, 1,1-bis(4-((aminophenyl)methyl)phenyl)-4-(4-heptylcyclohexyl)cyclohexane, 2,4-diamino-N,N-diallylaniline, 4-aminobenzylamine, 3-aminobenzylamine, 1-(2,4-diaminophenyl)piperazine-4-carboxylic acid, 4-(morpholin-4-yl)benzene-1,3-diamine, 1,3-bis(N-(4-aminophenyl)piperidinyl)propane. α-amino-ω-aminophenyl alkylene, and the like.

These can be used singly or in combination of two or more kinds.

When the total of the diamine units in the polyamide compound of the present invention is taken as 100% by mol, the content of the diamine unit other than the diamines represented by the above general formulae (2) (3) is not particularly limited. The content of the diamine unit other than the diamines represented by the general formulae (2) (3) is preferably less than 50% by mol, further preferably less than 30% by mol, and particularly preferably less than 10% by mol. This is because when the content of the diamine unit other than the diamine units represented by the general formulae (2) (3) is within this range, resistance to water absorption is improved.

[1-3 Polymerization Degree of Polyamide Compound]

The polymerization degree of the polyamide compound of the present invention is not particularly limited. The relative viscosity measured at 25° C. in a 1% concentrated sulfuric acid solution is preferably in the range of 1.01 to 5.0, and particularly preferably in the range of 2.0 to 4.0.

The relative viscosity is a ratio of the falling time (t) measured at 25° C. using a Cannon-Fenske viscometer after dissolving 1 g of the polyamide compound in 100 mL of a 96% sulfuric acid to the falling time (to) of 96% sulfuric acid itself measured in the same manner, and is represented by the following equation.

$$\text{Relative viscosity} = t/t_0$$

[1-4 Characteristics of Polyamide Compound]

The polyamide compound of the present invention uses a compound having a long chain (a dicarboxylic acid component capable of constituting a dicarboxylic acid unit).

Accordingly, the polyamide compound has a low content of hydrogen bonds in the molecule, thus has excellent resistance to water absorption.

Also, having an aromatic ring in the diamine unit, this portion functions as a hard segment. On the other hand, the portions of $-(CH_2)_n-$, $-(CH_2)_m-$ in the dicarboxylic acid unit function as a soft segment giving flexible properties. Accordingly, a polyamide compound having an aromatic ring in the diamine unit has a structure in which a soft segment and a hard segment are linked by an amide bond. Therefore, this polyamide compound becomes a resin that has a hydrophobic structure, is excellent in elongation characteristics due to the flexible alkyl chain of the soft segment and has a rigidity portion due to the aromatic ring of the hard segment.

Characteristics of the polyamide compound of the present invention include having high energy absorption. Also, other characteristics include having high water-absorption resistance rate. Moreover, other characteristics include being amorphous (transparent).

These characteristics are characteristics not seen in conventional polyamides obtained by polymerization of s-caprolactam, dicarboxylic acid and diamine, and 11-aminoundecane.

[2] Method for Producing Polyamide Compound

The method for producing a polyamide compound of the present invention comprises reacting a dicarboxylic acid compound having a structure represented by the following general formula (4) with a diamine compound.

[Chemical Formula 19]

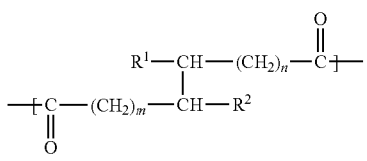
(4)

(wherein n represents 11, and m represents 11; $R^1$ represents n-$C_9H_{19}$; and $R^2$ represents n-$C_9H_{19}$.)

As the dicarboxylic acid compound, in addition to the dicarboxylic acid, a carboxylic acid derivative in which a hydroxyl group of a carboxyl group of the dicarboxylic acid is substituted with another hetero atom (an atom other than carbon, hydrogen and metal) can also be used. Examples of the carboxylic acid derivative include an acyl halide (acid halide) in which the hydroxyl group is replaced by halogen.

The polyamide compound of the present invention can be produced by polycondensation of a diamine component capable of constituting a diamine unit and a dicarboxylic acid component capable of constituting a dicarboxylic acid unit. The polymerization degree can be controlled by adjusting the polycondensation conditions and the like.

The method for producing the polyamide compound is not particularly limited. As the method for producing the polyamide compound, for example, (1) a method using an acid or base catalyst, (2) a method for activating a carboxylic acid, (3) a method using transesterification, (4) a method using a condensing agent and the like are suitably used. Here, as a suitable production method, a method for producing the polyamide compound using an acid chloride activated with a carboxylic acid is exemplified.

For example, the polyamide compound can be produced according to the following production scheme. Here, synthesis of a two-component polyamide compound containing a dicarboxylic acid unit represented by the general formula (1) and a diamine unit represented by the general formula (2) is taken as an example.

In this method, a dicarboxylic acid is activated to an acid chloride, and the acid chloride is reacted with a diamine to obtain a polyamide compound.

[Chemical Formula 20]

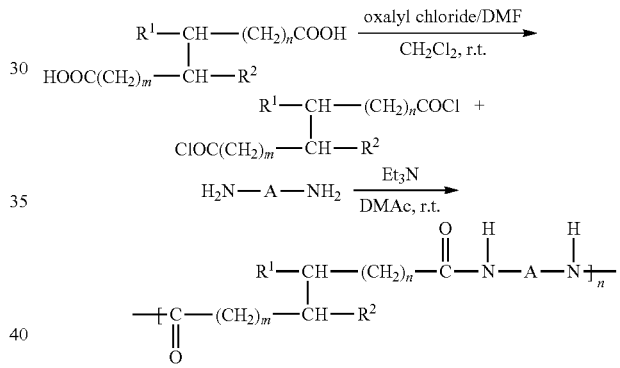

Next, synthesis of a three-component polyamide compound containing a dicarboxylic acid unit represented by the general formula (1), a diamine unit represented by the general formula (2) and a diamine unit represented by the general formula (3) is taken as an example.

In this method, a dicarboxylic acid is activated to an acid chloride, and the acid chloride is reacted with two kinds of diamines to obtain a polyamide compound.

[Chemical Formula 21]

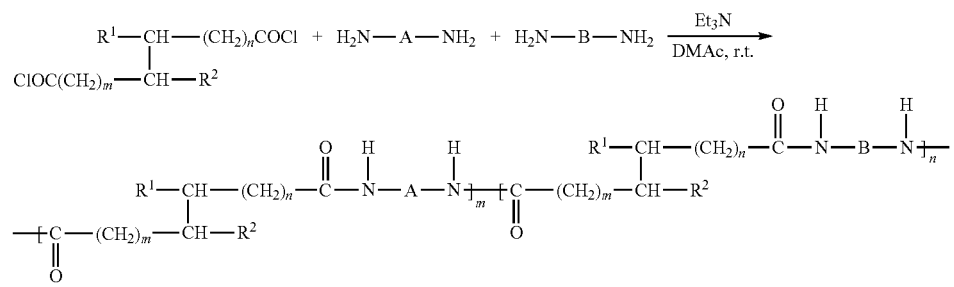

When a dicarboxylic acid is activated to an acid chloride and then reacted with a diamine, a polyamide compound having excellent resistance to water absorption can be efficiently produced.

Also, a monoamine or a monocarboxylic acid may be added as a molecular weight regulator during polycondensation. Moreover, in order to suppress the polycondensation reaction to obtain a desired polymerization degree, the ratio (molar ratio) of the diamine component and the carboxylic acid component constituting the polyamide compound may be adjusted by deviating from 1.

In the case of polymerization by a dehydrohalogenation reaction by the reaction of a carboxylic acid dihalide such as an acid chloride with a diamine as described above, the reaction rapidly proceeds, thus it is preferable to carry out the reaction at a relatively low temperature for controlling the reaction rate.

For example, the reaction is preferably carried out in the range of −10° C. to 100° C.

The reaction solvent is not particularly limited, and known solvents are widely applicable. Examples of an organic polar solvent as a reaction solvent include dimethylacetamide, N-methylpyrrolidone, dimethylsulfone, dimethylformamide, N-methylcaprolactam, tetramethylurea, N,N'-dimethyl-2-imidazolidinone, and the like. These may be used singly or as a mixed solvent of two or more kinds. Also, as necessary, hydrogen chloride or a halogenated metal salt such as lithium chloride, calcium chloride or potassium chloride may be used in combination to improve solubility.

Moreover, the concentration (polymer concentration) of the polyamide compound is not particularly limited, while it varies depending on the solubility of the produced polyamide compound in a solvent and the solution viscosity. For example, the concentration of the polyamide compound is preferably 0.1 to 40% by mass, from the viewpoint of productivity and the like.

The concentration of the polyamide compound is determined comprehensively based on the composition content and composition ratio, solubility, solution viscosity, handling property and ease of defoaming of the polyamide compound.

The method of adding raw materials is not particularly limited. For example, a diamine is added to a reaction solvent and dissolved at a low temperature, then a dicarboxylic acid halide such as an acid chloride as one raw material is added. In this case, it is preferable to carry out the reaction in an inert atmosphere (for example, in a nitrogen atmosphere, in an argon gas atmosphere) in order to prevent deterioration of the diamine. The molar ratio between the diamine and the acid halide should basically be equimolar, but in order to control the polymerization degree, the diamine or an acid component as one raw material may be added in excess, or a suitable amount of a monofunctional organic substance, for example, a compound such as aniline, naphthylamine, acetyl chloride or benzoyl chloride may be added.

In addition, in the case of the polyamide compound of the present invention, in order to improve the characteristics, an addition method intended to block the polymer may be also adopted such that a part of diamine or acid chloride is reacted and then the remaining raw material is added.

The polymerization reaction product (polyamide compound) obtained as above involves a hydrogen halide as a by-product, and thus needs to be neutralized. The neutralizing agent is not particularly limited as long as it is a generally known basic compound.

As the neutralizing agent, triethylamine, tripropylamine, benzyldimethylamine, lithium hydroxide, sodium hydroxide, potassium hydroxide, magnesium hydroxide, calcium hydroxide, magnesium oxide, calcium oxide, a tetraethylammonium salt or the like can be suitably used. Further, such a neutralizing agent may be added alone as a powder, but it is preferable to use a neutralizing agent which is finely powdered and dispersed as a slurry in an organic solvent, also from the viewpoint of reactivity and operability.

The polyamide compound solution obtained by the above method can be separated in a poor solvent such as water or methanol. Further, the solution after the neutralization reaction can also be used as it is as a solution for molding.

Also, the industrial polycondensation method of the polyamide compound of the present invention is not particularly limited, and known methods are widely used. Examples thereof include a pressurized salt method, an atmospheric dropping method, a pressurized dropping method, a reactive extrusion method, and the like. In addition, as the reaction temperature is as low as possible, yellowing and gelation of the polyamide compound can be suppressed, and a polyamide compound having stable properties is obtained.

In the pressurized salt method, melt polycondensation is carried out under pressure using a nylon salt as a raw material. Specifically, after preparing an aqueous solution of a nylon salt comprising a diamine component, a dicarboxylic acid component, and other components as necessary, the aqueous solution is concentrated, then heated under pressure, and polycondensed while removing condensed water. While gradually returning the pressure inside a can to atmospheric pressure, the temperature is raised to about the melting point of the polyamide compound+10° C., and held, then the pressure is further gradually reduced to 0.02 MPaG and kept at the same temperature, and polycondensation is continued. When a constant stirring torque is reached, the interior of the can is pressurized with nitrogen to about 0.3 MPaG to recover the polyamide compound.

In the atmospheric dropping method, a diamine component is continuously added dropwise to a mixture obtained by heating and melting a dicarboxylic acid component, and other components as necessary, under atmospheric pressure, and polycondensed while removing condensed water. The polycondensation reaction is carried out while raising the temperature of the reaction system so that the reaction temperature does not fall below the melting point of the polyamide compound to be produced.

In the pressurized dropping method, first, a dicarboxylic acid component and other components as necessary are charged in a polycondensation can, and the respective components are stirred and melt-mixed to prepare a mixture. Subsequently, while the interior of the can is pressurized preferably to about 0.3 to 0.4 MPaG, the diamine component is continuously added dropwise to the mixture, and polycondensed while removing condensed water. At this time, the polycondensation reaction is carried out while raising the temperature of the reaction system so that the reaction temperature does not fall below the melting point of the polyamide compound to be produced. When the set molar ratio is reached, the dropwise addition of the diamine component is finished, and while gradually returning the pressure inside a can to atmospheric pressure, the temperature is raised to about the melting point of the polyamide compound+10° C., and held, then the pressure is further gradually reduced to 0.02 MPaG and kept at the same temperature, and polycondensation is continued. When a constant stirring torque is reached, the interior of the can is pressurized with nitrogen to about 0.3 MPaG to recover the polyamide compound.

The reactive extrusion method is a method of incorporating into the skeleton of polyamide by a transamidation reaction.

[3] Polyamide Composition Using Polyamide Compound

To the polyamide compound of the present invention, additives such as a lubricant, a crystallization nucleating agent, an anti-whitening agent, a matting agent, a heat stabilizer, a weathering stabilizer, an ultraviolet absorber, a plasticizer, a flame retardant, an antistatic agent, a coloring inhibitor, an antioxidant, and an impact modifier may be added, according to application and performance, to form a polyamide composition. These additives can be added as necessary as long as the effect of the present invention is not impaired. Also, the polyamide compound of the present invention may be mixed with various resins, according to application and performance requirements, to form a polyamide composition.

[4] Application of Polyamide Compound

The polyamide compound of the present invention can be used for all applications requiring low water absorption. For example, it is used as interior materials and exterior materials for automobiles, railroad vehicles, ships, aircraft, and the like. Among them, examples of automotive supplies include automotive interior materials, automotive instrument panels, automotive exterior materials, and the like. Specific examples include a door base material, a package tray, a pillar garnish, a switch base, a quarter panel, a side panel, an arm rest, an automotive door trim, a seat structural material, a seat back board, a ceiling material, a console box, an automotive dashboard, various instrument panels, a deck trim, a bumper, a spoiler, a cowling, and the like. Further, examples include interior materials and exterior materials of buildings, furniture, and the like. That is, examples include door surface materials, door structural materials, surface materials for various furniture (desk, chair, shelf, chest of drawers, etc.), and the like. In addition, examples include packages, storage bodies (trays etc.), protective members, partition members, and the like.

EXAMPLES

Hereinafter, the present invention will be described further specifically with reference to Examples.

Experimental Examples 9, 10, 14, 15, 16, 17, 18, 19 and 20 are examples of the invention, and Experimental Examples 1, 2, 3, 4, 5, 6, 7, 8, 11, 12 and 13 are reference examples.

1. Synthesis of Polyamide Compound

Experimental Example 1 (Synthesis of PA-C6)

A polyamide compound (PA-C6) was synthesized according to the following scheme (Experimental Examples 2 to 10 were also synthesized according to the same scheme).

[Chemical Formula 22]

Two-component polyamide n-$C_9H_{19}$—CH—$(CH_2)_{11}$COOH
  |
HOOC$(CH_2)_{11}$—CH—$C_9H_{19}$-n $\xrightarrow{\text{oxalyl chloride/DMF}}_{CH_2Cl_2, \text{r.t.}}$ -continued n-$C_9H_{19}$—CH—$(CH_2)_{11}$COCl
  |
ClOC$(CH_2)_{11}$—CH—$C_9H_{19}$-n $H_2N$—A—$NH_2$ $\xrightarrow{Et_3N}_{DMAc, \text{r.t.}}$ n-$C_9H_{19}$—CH—$(CH_2)_{11}$—C(=O)—N(H)—A—N(H)—
  |
—C(=O)—$(CH_2)_{11}$—CH—$C_9H_{19}$-n ⟩$_n$ Two-component polyamide

A = —$(CH_2)_4$—  —$(CH_2)_6$—  —$(CH_2)_8$—  —$(CH_2)_{10}$—
—$(CH_2)_{12}$—

(cyclohexylene), (phenylene),
(diphenyl ether), (diphenylmethane),
(diphenyl sulfone),
(bisphenol A type bis(phenoxyphenyl))

In detail, 1,6-diaminohexane (C6) (1.09 g, 7.85 mmol) and DMAc (20 mL) were added into a flask (100 mL) in a nitrogen atmosphere, and stirred at room temperature for a while, followed by adding triethylamine (1.37 mL, 9.81 mmol), then the mixture was stirred at 0° C. for 5 minutes. Thereafter, acid chloride (2) (5.30 g, 7.85 mmol) was dissolved in DMAc (5 mL) and added dropwise to the mixture, and the mixture was reacted for 4 hours. After completion of the reaction, the product was reprecipitated with methanol for purification, and filtered to obtain a target object. The product was vacuum-dried (95° C., 6 hours). White powder, yield: 4.7 g, FT-IR (ATR, cm$^{-1}$): 3305 (NH, amide), 2922, 2850, 2355, 1633 (C=O, carbonyl), 1538, 1457, 1030, 680.

The chemical formula of the diamine used in the present experimental example is shown below.

$H_2N$—$(CH_2)_6$—$NH_2$      [Chemical Formula 23]

Experimental Example 2 (Synthesis of PA-C8)

Synthesis was carried out in the same manner as the synthesis of PA-C6, except for using 1,8-diaminooctane (C8) (0.72 g, 4.87 mmol), triethylamine (0.85 mL, 6.09 mmol), acid chloride (2) (3.29 g, 4.87 mmol), and DMAc (25 mL). Pale yellow powder, yield: 3.0 g, FT-IR (ATR, cm$^{-1}$): 3301.5 (NH, amide), 2918.7, 2846.4, 1641.1 (C=O, carbonyl), 1545.7, 1461.8, 719.3.

The chemical formula of the diamine used in the present experimental example is shown below.

$H_2N$—$(CH_2)_8$—$NH_2$      [Chemical Formula 24]

Experimental Example 3 (Synthesis of PA-C10)

Synthesis was carried out in the same manner as the synthesis of PA-C6, except for using 1,10-diaminodecane (C10) (0.85 g, 4.77 mmol), triethylamine (0.83 mL, 5.96 mmol), acid chloride (2) (3.22 g, 4.77 mmol), and DMAc (20 mL). White powder, yield: 3.3 g, FT-IR (ATR, cm$^{-1}$): 3296.7 (NH, amide), 2918.7, 2846.4, 1641.1 (C=O, carbonyl), 1539.9, 1459.8, 723.2.

The chemical formula of the diamine used in the present experimental example is shown below.

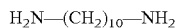
[Chemical Formula 25]

$H_2N-(CH_2)_{10}-NH_2$

Experimental Example 4 (Synthesis of PA-C12)

Synthesis was carried out in the same manner as the synthesis of PA-C6, except for using 1,12-diaminododecane (C12) (0.86 g, 4.3 mmol), triethylamine (0.76 mL, 5.4 mmol), acid chloride (2) (2.93 g, 4.3 mmol), and DMAc (20 mL). White powder, yield: 3.0 g, FT-IR (ATR, cm$^{-1}$): 3305.4 (NH, amide), 2918.7, 2850.3, 1637.3 (C=O, carbonyl), 1538.0, 1457.9, 719.3.

The chemical formula of the diamine used in the present experimental example is shown below.

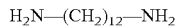
[Chemical Formula 26]

$H_2N-(CH_2)_{12}-NH_2$

Experimental Example 5 (Synthesis of PA-Cy)

Synthesis was carried out in the same manner as the synthesis of PA-C6, except for using 1,6-diaminocyclohexane (Cy) (0.58 g, 5.08 mmol), triethylamine (0.89 mL, 6.35 mmol), acid chloride (2) (3.43 g, 5.08 mmol), and DMAc (25 mL). White powder, yield: 3.1 g, FT-IR (ATR, cm$^{-1}$): 3290.0 (NH, amide), 2916.8, 2850.3, 1637.3 (C=O, carbonyl), 1538.0, 1453.1, 723.2.

The chemical formula of the diamine used in the present experimental example is shown below.

[Chemical Formula 27]

Experimental Example 6 (Synthesis of PA-PD)

Synthesis was carried out in the same manner as the synthesis of PA-C6, except for using p-phenylenediamine (PD) (0.65 g, 5.85 mmol), triethylamine (1.02 mL, 7.31 mmol), acid chloride (2) (3.95 g, 5.85 mmol), and DMAc (25 mL). Pale yellow powder, yield: 3.8 g, FT-IR (ATR, cm$^{-1}$): 3293.8 (NH, amide), 2922.6, 2849.3, 1658.5 (C=O, carbonyl), 1513.8, 1461.6, 1400.1, 835.0, 717.4, 515.9.

The chemical formula of the diamine used in the present experimental example is shown below.

[Chemical Formula 28]

Experimental Example 7 (Synthesis of PA-DPE)

Synthesis was carried out in the same manner as the synthesis of PA-C6, except for using 4,4'-diaminodiphenyl ether (DPE) (1.01 g, 5.06 mmol), triethylamine (0.89 mL, 6.33 mmol), acid chloride (2) (3.42 g, 5.06 mmol), and DMAc (25 mL). Pale yellow fiber, yield: 3.8 g, FT-IR (ATR, cm$^{-1}$): 3290.0 (NH, amide), 2919.7, 2850.3, 1653.7 (C=O, carbonyl), 1497.5, 1226.6, 831.2.

The chemical formula of the diamine used in the present experimental example is shown below.

[Chemical Formula 29]

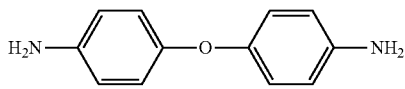

Experimental Example 8 (Synthesis of PA-DPM)

Synthesis was carried out in the same manner as the synthesis of PA-C6, except for using 4,4'-diaminodiphenyl methane (DPM) (1.0 g, 5.06 mmol), triethylamine (0.71 mL, 5.06 mmol), acid chloride (2) (3.42 g, 5.06 mmol), and DMAc (20 mL). Pale yellow powder, yield: 3.7 g, FT-IR (ATR, cm$^{-1}$): 3305.4 (NH, amide), 2919.7, 2850.3, 1658.5 (C=O, carbonyl), 1597.7, 1513.8, 1459.8, 1409.7, 810.9, 715.5, 502.4.

The chemical formula of the diamine used in the present experimental example is shown below.

[Chemical Formula 30]

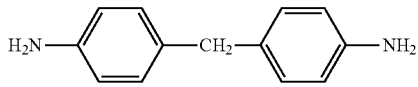

Experimental Example 9 (Synthesis of PA-BPE)

Synthesis was carried out in the same manner as the synthesis of PA-C6, except for using 2,2-bis[4-(4-aminophenoxy)phenyl]propane (BPE) (2.94 g, 7.02 mmol), triethylamine (1.23 mL, 8.8 mmol), acid chloride (2) (4.74 g, 7.02 mmol), and DMAc (25 mL). Pale brown fiber, yield: 7.3 g, FT-IR (ATR, cm$^{-1}$): 3293.8 (NH, amide), 2917.8, 2849.3, 1653.7 (C=O, carbonyl), 1492.6, 1220.7, 831.2, 512.0.

The chemical formula of the diamine used in the present experimental example is shown below.

[Chemical Formula 31]

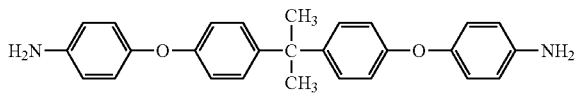

Experimental Example 10 (Synthesis of PA-BS)

Synthesis was carried out in the same manner as the synthesis of PA-C6, except for using 4,4'-diaminodiphenyl sulfone (bis(4-aminophenyl)sulfone, BS) (1.36 g, 5.33 mmol), triethylamine (0.93 mL, 6.7 mmol), acid chloride (2)

(3.6 g, 5.33 mmol), and DMAc (25 mL). Pale yellow powder, yield: 3.4 g, FT-IR (ATR, cm$^{-1}$): 3313.1 (NH, amide), 2919.7, 2846.4, 1666.2 (C=O, carbonyl), 1592.9, 1517.7, 1402.0, 1301.7, 1146.7, 1102.1, 835.0, 551.5.

The chemical formula of the diamine used in the present experimental example is shown below.

[Chemical Formula 32]

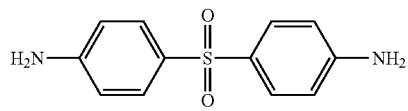

Experimental Example 11 (Synthesis of PA-C12 (0.5)/PD (0.5))

A polyamide compound (PA-C12 (0.5)/PD (0.5)) was synthesized according to the following scheme (Experimental Examples 12 to 17 were also synthesized according to the same scheme).

[Chemical Formula 33]

Three-component polyamide

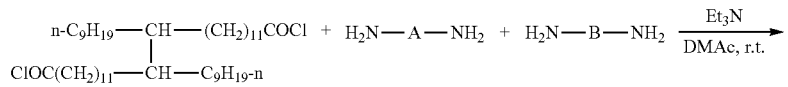

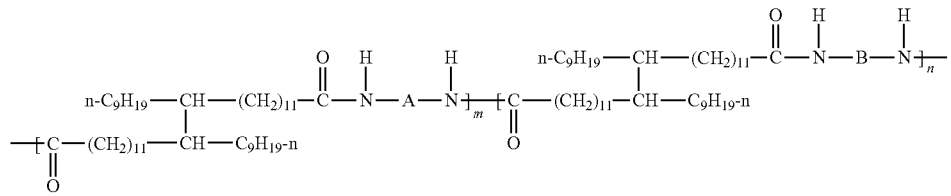

Three-component polyamide

A, B = 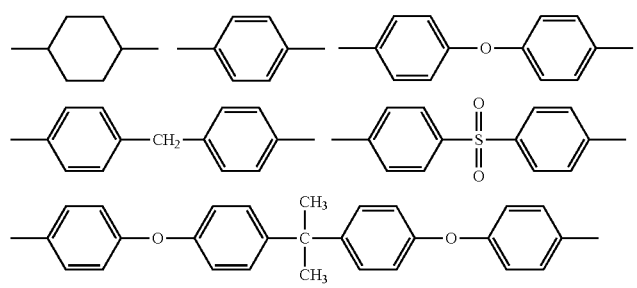

Synthesis was carried out in the same manner as the synthesis of PA-C6, except for using 1,12-diaminododecane (C12) (0.5 g, 2.5 mmol), p-phenylenediamine (PD) (0.28 g, 2.5 mmol), triethylamine (1.05 mL, 7.5 mmol), acid chloride (2) (3.38 g, 5.0 mmol), and DMAc (20 mL). Pale yellow powder, yield: 3.4 g, FT-IR (ATR, cm$^{-1}$): 3297.7 (NH, amide), 2918.7, 2854.1, 1645.0 (C=O, carbonyl), 1549.5, 1513.8, 1461.8, 719.3.

The chemical formula of the diamine used in the present experimental example is shown below.

[Chemical Formula 34]

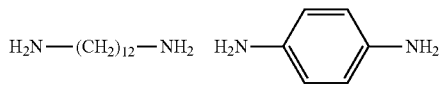

Experimental Example 12 (Synthesis of PA-PD (0.5)/DPM (0.5))

Synthesis was carried out in the same manner as the synthesis of PA-C6, except for using p-phenylenediamine (PD) (0.23 g, 2.1 mmol), 4,4'-diaminodiphenylmethane (DPM) (0.43 g, 2.1 mmol), triethylamine (0.74 mL, 5.28 mmol), acid chloride (2) (2.85 g, 4.22 mmol), and DMAc (20 mL). Pale yellow powder, yield: 3.0 g, FT-IR (ATR, cm$^{-1}$): 3305.4 (NH, amide), 2917.8, 2849.3, 1657.5 (C=O, carbonyl), 1511.9, 1461.8, 1405.9, 715.5.

The chemical formula of the diamine used in the present experimental example is shown below.

[Chemical Formula 35]

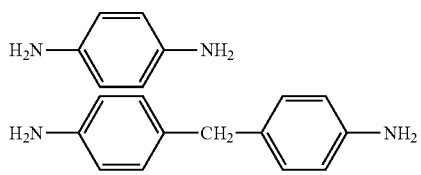

Experimental Example 13 (Synthesis of PA-PD (0.5)/DPE (0.5))

Synthesis was carried out in the same manner as the synthesis of PA-C6, except for using p-phenylenediamine (PD) (0.29 g, 2.56 mmol), 4,4'-diaminodiphenyl ether (DPE) (0.51 g, 2.56 mmol), triethylamine (0.9 mL, 6.4 mmol), acid chloride (2) (3.46 g, 5.12 mmol), and DMAc (25 mL). Pale yellow powder, yield: 4.0 g, FT-IR (ATR, cm$^{-1}$): 3293.8 (NH, amide), 2922.6, 2846.4, 1657.5 (C=O, carbonyl), 1501.3, 1222.6, 831.2, 715.5, 513.9

The chemical formula of the diamine used in the present experimental example is shown below.

[Chemical Formula 36]

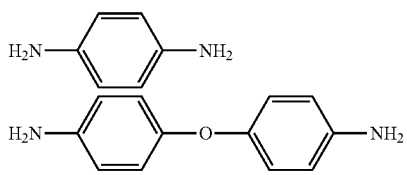

Experimental Example 14 (Synthesis of PA-BPE (0.5)/C4 (0.5))

Synthesis was carried out in the same manner as the synthesis of PA-C6, except for using 2,2-bis[4-(4-aminophenoxy)phenyl]propane (BPE) (1.07 g, 2.6 mmol), 1,4-diaminobutane (C4) (0.23 g, 2.6 mmol), triethylamine (0.73 mL, 6.4 mmol), acid chloride (2) (3.51 g, 5.19 mmol), and DMAc (25 mL). White powder, yield: 3.8 g, FT-IR (ATR, cm$^{-1}$): 3292.9 (NH, amide), 1657.5 (C=O, carbonyl).

The chemical formula of the diamine used in the present experimental example is shown below.

[Chemical Formula 37]

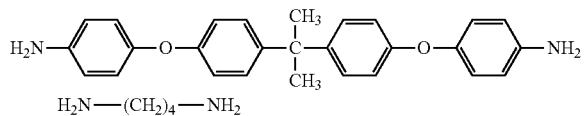

Experimental Example 15 (Synthesis of PA-BPE (0.5)/PD (0.5))

Synthesis was carried out in the same manner as the synthesis of PA-C6, except for using 2,2-bis[4-(4-aminophenoxy)phenyl]propane (BPE) (1.22 g, 2.92 mmol), p-phenylenediamine (PD) (0.32 g, 2.92 mmol), triethylamine (1.02 mL, 7.3 mmol), acid chloride (2) (3.94 g, 5.83 mmol), and DMAc (25 mL). Pale yellow powder, yield: 4.7 g, FT-IR (ATR, cm$^{-1}$): 3293.8 (NH, amide), 2923.6, 2854.1, 1653.7 (C=O, carbonyl), 1501.3, 1461.8, 1402.0, 1230.4, 827.3.

The chemical formula of the diamine used in the present experimental example is shown below.

[Chemical Formula 38]

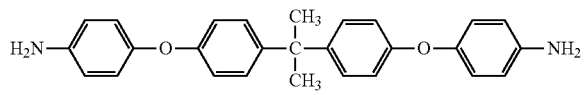

Experimental Example 16 (Synthesis of PA-BPE (0.75)/DPM (0.25))

Synthesis was carried out in the same manner as the synthesis of PA-C6, except for using 2,2-bis[4-(4-aminophenoxy)phenyl]propane (BPE) (1.85 g, 4.44 mmol), 4,4'-diaminodiphenylmethane (DPM) (0.3 g, 1.48 mmol), triethylamine (1.04 mL, 7.4 mmol), acid chloride (2) (4.0 g, 5.92 mmol), and DMAc (25 mL). Pale yellow powder, yield: 6.2 g, FT-IR (ATR, cm$^{-1}$): 3293.8 (NH, amide), 1653.7 (C=O, carbonyl).

The chemical formula of the diamine used in the present experimental example is shown below.

[Chemical Formula 39]

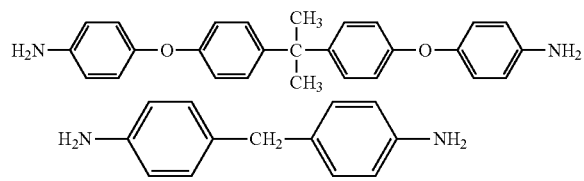

Experimental Example 17 (Synthesis of PA-BPE (0.75)/PD (0.25))

Synthesis was carried out in the same manner as the synthesis of PA-C6, except for using 2,2-bis[4-(4-aminophenoxy)phenyl]propane (BPE) (2.14 g, 5.13 mmol), p-phenylenediamine (PD) (0.19 g, 1.71 mmol), triethylamine (1.2 mL, 8.6 mmol), acid chloride (2) (4.62 g, 6.84 mmol), and DMAc (25 mL). Pale yellow powder, yield: 6.6 g, FT-IR (ATR, cm$^{-1}$): 3292.9 (NH, amide), 2920.7, 2854.1, 1657.5 (C=O, carbonyl), 1497.5, 1456.0, 1401.0, 1230.4, 827.3.

The chemical formula of the diamine used in the present experimental example is shown below.

[Chemical Formula 40]

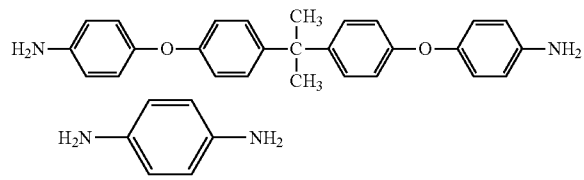

Synthesis of Polyamide Compound for Evaluation of Mechanical Properties and Test Piece Preparation

Experimental Example 18 (Synthesis of PA/BPE)

2,2-bis[4-(4-aminophenoxy)phenyl]propane (BPE) (35.7 g, 52.85 mmol) and DMAc (140 mL) were added into a separable flask (500 mL) in a nitrogen atmosphere, and stirred using a mechanical stirrer for a while at 0° C., followed by adding triethylamine (18.5 mL, 132.0 mmol), then the mixture was stirred at 0° C. for 5 minutes. Thereafter, acid chloride (2) (35.7 g, 52.85 mmol) was dissolved in DMAc (40 mL) and added dropwise to the mixture, and the mixture was reacted at room temperature for 4 hours. After completion of the reaction, the product was reprecipitated with water for purification, and washed four times. The product was vacuum-dried (85° C., 8 hours). White fiber, yield: 50.0 g. FT-IR (ATR, cm$^{-1}$): 3293.8 (NH, amide), 2917.8, 2849.3, 1653.7 (C=O, carbonyl), 1492.6, 1220.7, 831.2, 512.0.

Using the synthesized polyamide compound, a test piece was prepared by the method described later. The molding temperature was set at 150 to 170° C., and the mold temperature was set at 15 to 17° C.

Experimental Example 19 (Synthesis of PA/BPE (0.8)/DPE (0.2))

2,2-bis[4-(4-aminophenoxy)phenyl]propane (BPE) (27.2 g, 64.9 mmol), 4,4'-diaminodiphenyl ether (DPE) (3.3 g, 16.2 mmol) and DMAc (180 mL) were added into a separable flask (500 mL) in a nitrogen atmosphere, and stirred using a mechanical stirrer for a while at 0° C., followed by adding triethylamine (28.4 mL, 202.8 mmol), then the mixture was stirred at 0° C. for 5 minutes. Thereafter, acid chloride (2) (54.8 g, 812.1 mmol) was dissolved in DMAc (70 mL) and added dropwise to the mixture, and the mixture was reacted at room temperature for 4 hours. After completion of the reaction, the product was reprecipitated with water for purification, and washed four times. The product was vacuum-dried (90° C., 8 hours). White fiber, yield: 80.0 g. FT-IR (ATR, cm$^{-1}$): 3288.3 (NH, amide), 2914.3, 2846.7, 1657.1 (C=O, carbonyl), 1459.7, 1210.4, 835.9, 706.4, 514.3.

Using the synthesized polyamide compound, a test piece was prepared by the method described later. The molding temperature was set at 150 to 170° C., and the mold temperature was set at 15 to 17° C.

The chemical formula of the diamine used in the present experimental example is shown below.

[Chemical Formula 41]

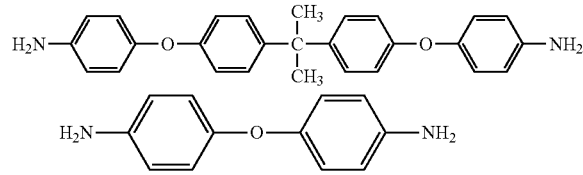

Experimental Example 20 (Synthesis of PA/BPE (0.8)/NB (0.2))

Synthesis was carried out in the same manner as the synthesis of PA/BPE (0.8)/DPE (0.2) (Example 19), except for using 2,2-bis[4-(4-aminophenoxy)phenyl]propane (BPE) (45.4 g, 67.2 mmol), bisaminoethylnorbornene (NB) (2.1 g, 13.4 mmol) and DMAc (170 mL) and triethylamine (23.6 mL, 168.0 mmol), acid chloride (2) (45.4 g, 67.2 mmol), and DMAc (50 mL). White fiber, yield: 64.0 g. FT-IR (ATR, cm$^{-1}$): 3296.7 (NH, amide), 2921.6, 2851.2, 1654.6 (C=O, carbonyl), 1605.4, 1541.8, 1498.4, 1228.4, 830.2, 721.2, 513.0.

Using the synthesized polyamide compound, a test piece was prepared by the method described later. The molding temperature was set at 140 to 160° C., and the mold temperature was set at 16 to 17° C.

The chemical formula of the diamine used in the present experimental example is shown below.

[Chemical Formula 42]

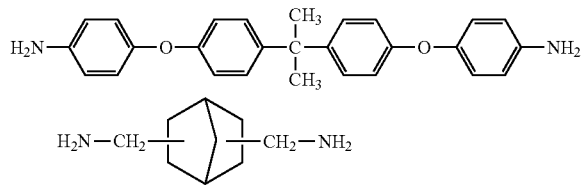

Bisaminoethylnorbornene (NB)

2. Test Method of Various Physical Properties

[1] TGA (Thermogravimetric Analysis Measurement)

Measurement was performed with a sample weight of 10 mg in the temperature range of 30 to 550° C. to obtain a thermal decomposition temperature of $T_d$ (5% weight loss temperature). For TGA measurement, TG-DTA 2000 SA, BRUKER AXS K.K. was used.

[2] Water Absorption Rate Test

A previously vacuum-dried polyamide compound was molded using a hot press. A test piece of 43.0 mm in length×26.0 mm in width×2.0 mm in thickness was used. The measurement conditions were as follows.

Before measurement of the water absorption rate, the weight of the previously vacuum-dried (temperature: 25° C., 6 hours) test piece was accurately measured. Thereafter, the test piece was immersed in a beaker containing ion-exchanged water (100 mL) for 24 hours. After immersion, the test piece was removed from the beaker, and the water attached to the surface was wiped off. The weight was accurately measured, and the weight difference of the test piece was obtained.

[3] Dynamic Viscoelasticity Test

The storage elastic modulus and the temperature dependence of tan δ of the polyamide compound were determined by dynamic viscoelasticity measurement. The width and thickness of the sample were measured and used as measured parameters. For the measurement, a dynamic viscoelasticity measuring apparatus Rheogel-E4000 manufactured by UBM was used, and the measurement conditions were as follows.

Measurement temperature range: −100 to 100° C., temperature increase rate: 4° C./min, measurement frequency: 5 Hz, strain (ε): (storage elastic modulus)>10$^8$ Pa: 0.05%. As the test piece, previously vacuum-dried polyamide was molded using a hot press. A test piece of 5 mm in width×2.0 mm in thickness×30 mm in length was prepared and used for dynamic viscoelasticity measurement.

[4] Evaluation of Mechanical Properties (1) Test Piece Preparation

In the preparation of the test piece by injection molding, a sample (about 500 g) collected by scale-up synthesis of each polyamide compound (bio-polyamide) was used. The sample was molded into a flat plate, using Mini Test Press-10 manufactured by Toyo Seiki Seisaku-sho, Ltd. The polyamide compound molded into a flat plate was cut with scissors to form pellets. The obtained pellets were molded into test pieces using an injection molding machine (small electric injection molding machine SE18DUZ, manufactured by Sumitomo Heavy Industries, Ltd.). As the molding conditions, the resin temperature was set to 140 to 200° C., and the mold temperature was set to 14 to 18° C. A multipurpose test piece 5A type (dumbbell shape) of JIS K 7162 (t 2 mm) and a test piece of 10 mm in width×80 mm in length×4 mm in thickness (strip shape) were molded as test pieces. The dumbbell-shaped test piece was used for a tensile test. The strip test piece was processed into a type 1 test piece of K7110 and used for Charpy impact test and bending test.

(2) Tensile Test

The tensile characteristics were evaluated for yield stress (tensile strength), tensile elastic modulus and elongation at break by performing a tensile test. A multipurpose test piece 5A type (dumbbell shape) of JIS K7162 was used as a test piece. In the measurement, the width and thickness of the test piece were measured and used. For the measurement, an AGI-50 kN type tester manufactured by Shimadzu Corporation was used. The measurement conditions were set at a tensile speed of 1 mm/min, a tensile load of 50 kN, and a measurement temperature of 23° C.

(3) Bending Test

The bending characteristics were evaluated for flexural modulus and bending strength by performing a bending test. As to the test piece, the type 1 test piece of K7110 prepared in (1) was evaluated in accordance with K7171. In the test, the width and thickness of the test piece were measured. For the measurement, an AGS-X10 kNX 5 tester manufactured by Shimadzu Corporation was used. The measurement conditions were set at a test speed of 2 mm/min, a maximum load of 10 kN, and a measurement temperature of 23° C.

(4) Charpy Impact Test

Impact resistance was evaluated by Charpy impact value obtained by performing a notched Charpy test. A test piece was prepared by putting a notch in the type 1 test piece of K7110 prepared in (1), in accordance with K7111. In the test, the width and thickness of the test piece were measured. For the measurement, a Charpy impact tester, DG-UB, Toyo Seiki Seisaku-sho, Ltd. was used.

3. Test Results

[1] Results of TGA, Water Absorption Rate Test, and Dynamic Viscoelasticity Test The test results of the two-component polyamide compound are shown in Table 1.

TABLE 1

Properties of two-component polyamide

| | Polyamide | tanδ | Water absorption rate (%) | $T_g$ (° C.) | $T_d$ (° C.) |
|---|---|---|---|---|---|
| Experimental Example 1 | PA-C6 | 0.23 | 0.25 | −14.0 | 420.2 |
| Experimental Example 2 | PA-C8 | 0.25 | 0.13 | −13.9 | 422.9 |
| Experimental Example 3 | PA-C10 | 0.23 | 0.12 | −14.0 | 423.9 |
| Experimental Example 4 | PA-C12 | 0.21 | 0.12 | −8.0 | 422.3 |
| Experimental Example 5 | PA-Cy | — | — | — | 418.1 |
| Experimental Example 6 | PA-PD | 0.19 | 0.06 | −4.0 | 428.8 |
| Experimental Example 7 | PA-DPE | 0.10 | 0.06 | −4.0 | 431.7 |
| Experimental Example 8 | PA-DPM | 0.10 | 0.05 | −4.0 | 433.1 |
| Experimental Example 9 | PA-BPE | 1.18 | 0.30 | 54.1 | 434.9 |
| Experimental Example 10 | PA-BS | — | — | — | 425.1 |

The test results of the three-component polyamide compound are shown in Table 2.

TABLE 2

Properties of three-component polyamide

| | Polyamide | tanδ | Water absorption rate (%) | $T_g$ (° C.) | $T_d$ (° C.) |
|---|---|---|---|---|---|
| Experimental Example 11 | PA-C12(0.5)/PD(0.5) | — | — | — | 423.9 |
| Experimental Example 12 | PA-PD(0.5)/DPM(0.5) | — | — | — | 430.3 |
| Experimental Example 13 | PA-PD(0.5)/DPE(0.5) | — | — | — | 430.2 |
| Experimental Example 14 | PA-BPE(0.5)C4(0.5) | — | — | — | 437.7 |
| Experimental Example 15 | PA-BPE(0.5)/PD(0.5) | 0.71 | 0.06 | 66.0 | 445.5 |
| Experimental Example 16 | PA-BPE(0.75)/DPM(0.25) | 1.11 | — | 52.1 | 443.0 |
| Experimental Example 17 | PA-BPE(0.75)/PD(0.25) | 0.92 | — | 50.1 | 442.6 |

A graph of water absorption rates of a conventional polyamide compound and a polyamide compound of the experimental example is shown in FIG. 1.

Figure 2:
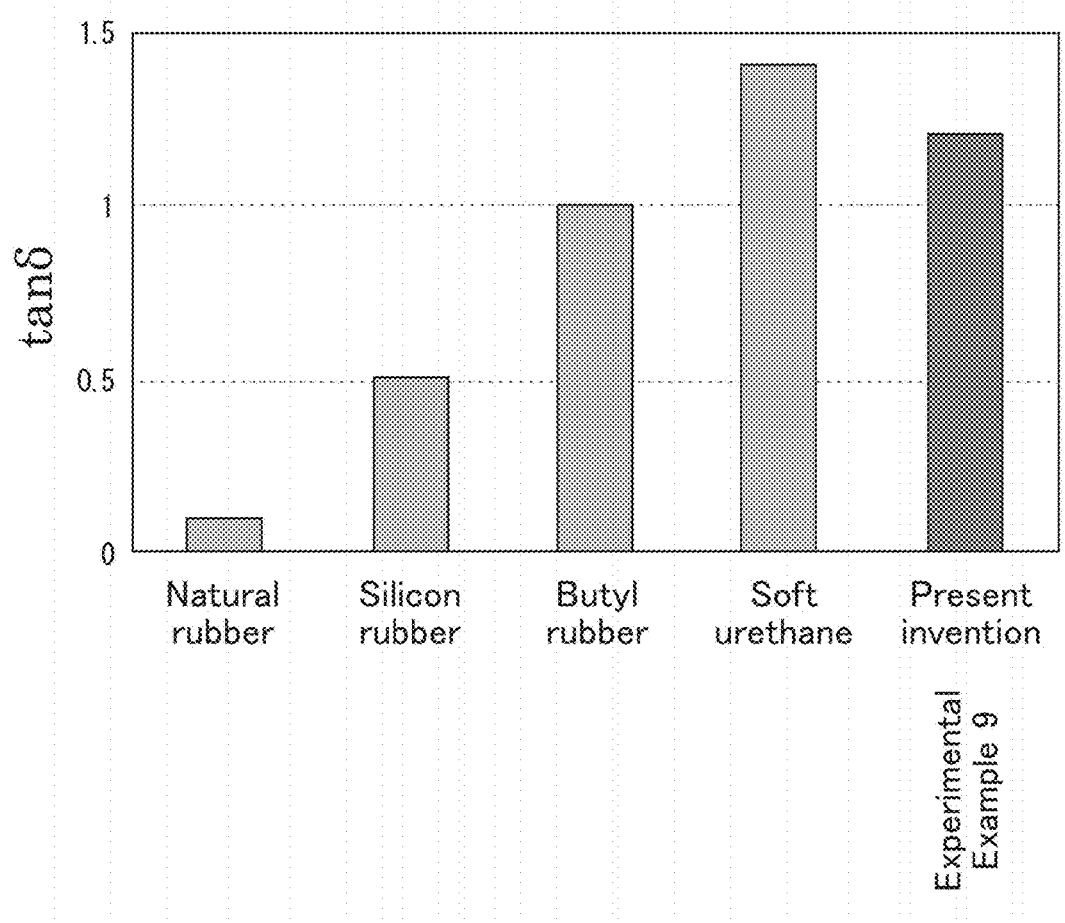
FIG. 2 is a graph comparatively showing tan δ of a conventional impact absorbing resin and a polyamide compound of the experimental example.

Also, a graph comparing the tan S of the conventional impact absorbing resin and the polyamide compound of the experimental example is shown in FIG. 2.

Figure 3:
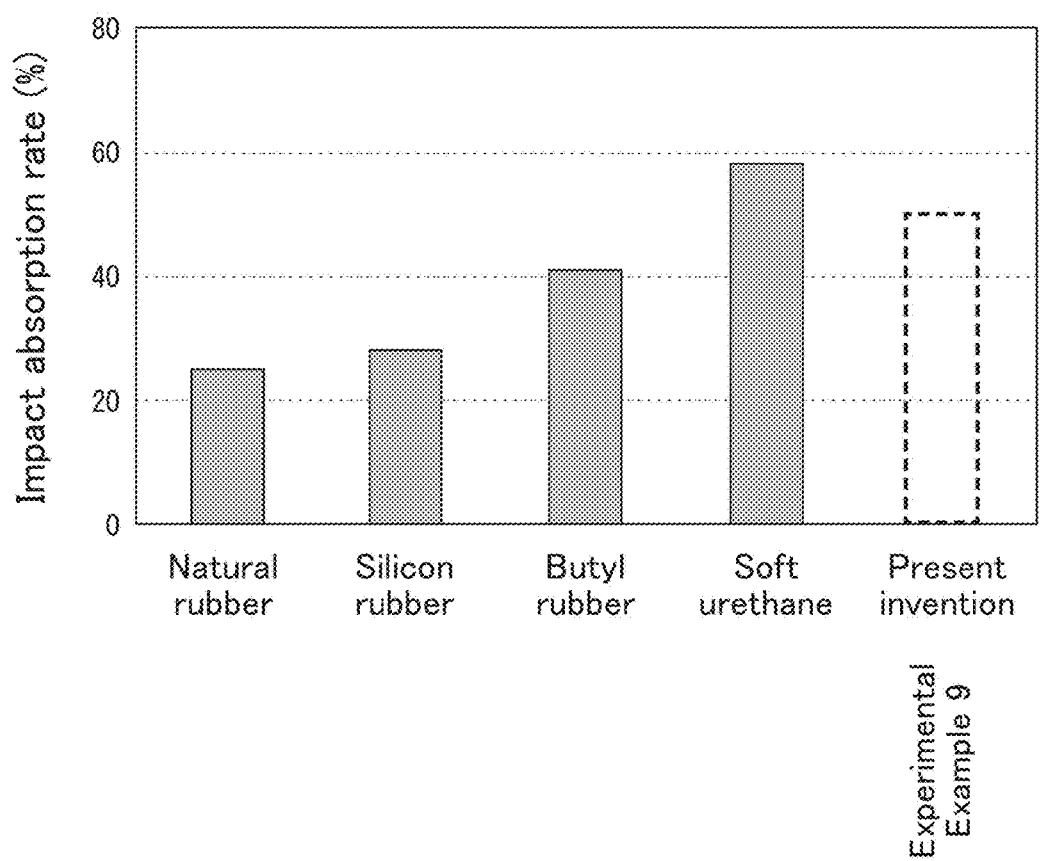
FIG. 3 is a graph showing the impact absorption rate of the polyamide compound of the experimental example estimated from the value of tan δ.

In addition, the impact absorption rate of the polyamide compound of the experimental example of the present invention estimated from the value of tan S in FIG. 2 is shown in FIG. 3.

From Table 1, Table 2, and FIG. 1, it can be seen that the polyamide compound of any of the examples has high water absorption resistance, as compared to the conventional polyamide compound.

In detail, it was confirmed that the polyamide compound of the experimental example has high water absorption resistance as compared to water absorption of the conventional polyamide compounds (PA6: 9.0%, PA66: 8.5%, PA11: 1.9%, PA12: 1.6%). It is inferred that this is because the polyamide compound of the present experimental example has a long chain molecule introduced into the molecule, whereby the hydrogen bonding moiety (moiety that absorbs water) is reduced and the bonding of water molecules can be reduced.

From FIG. 1, it can be seen that, in particular, the water-absorption resistance rate of the polyamide compound of the present experimental example was improved about 5 to 30 times, as compared with the water absorption rate (1.5%, saturated state) of PA12, which is a conventional polyamide compound.

The storage elastic modulus tan δ of polyamide determined by dynamic viscoelasticity measurement is shown in Tables 1 and 2 above. The storage elastic modulus at −50° C. and the glass transition temperature determined from the peak of tan δ, as determined by dynamic viscoelasticity measurement, are also shown in Tables 1 and 2.

When the viscoelastic body is deformed by applying stress, most of the applied force is stored as the energy of the internal deformation and becomes the driving force of restoration upon removal of the stress. On the other hand, a part of the applied force is consumed for the friction of the internal molecular movement accompanying the distortion, eventually turning into heat.

The value indicating the magnitude of internal friction is tan δ. When the tan δ is large, the transfer rate is small and the energy absorption rate is large.

As shown in FIG. 2, it can be seen that the tan δ of the polyamide compound of the experimental example has a value comparable to that of the conventional impact absorbing resin.

Further, as shown in FIG. 3, it can be seen that the impact absorption rate of the polyamide compound of the experimental example estimated from the value of tan S in FIG. 2 also has a value comparable to that of the conventional impact absorbing resin.

As described above, the impact absorption rate (energy absorption rate) could be estimated by dynamic viscoelasticity measurement. Generally, the higher the tan δ, the higher the energy absorption rate. The impact absorption rate of natural rubber is 25%, tan δ=0.1, the impact absorption rate of silicone rubber is 28%, tan δ=0.5, the impact absorption rate of butyl rubber is 41%, tan δ=1.0, and the impact absorption rate of flexible polyurethane is 58%, tan δ=1.4.

In addition, it was confirmed that the test piece obtained by molding was transparent and the polyamide compound of the present invention was an amorphous resin.

[2] Evaluation of Mechanical Properties

The measurement results of the mechanical properties of the polyamide compound are shown in Table 3.

of the polyamide compounds had excellent tensile properties, bending characteristics, and impact properties.

<Effect of Experimental Examples>

The polyamide compound of the experimental example is a resin having a hydrophobic structure, a flexible alkyl chain, elongation characteristics and a rigidity portion, in which a soft segment and a hard segment are linked by an amide bond. By this polyamide compound, a resin having both high strength and high energy absorption performance is realized. The polyamide of the experimental example has the following three characteristics. That is, it is characterized by [1] having high energy absorption, [2] having high water-absorption resistance rate, and [3] being amorphous (transparent).

In addition, the polyamide compounds of Examples 18, 19, and 20 are characterized by having excellent tensile properties, bending characteristics, and impact properties.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope or nature of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the embodiments detailed above, and various modifications or changes are possible within the scope of the claims of the present invention.

INDUSTRIAL APPLICABILITY

The polyamide compound of the present invention can be used for all applications requiring low water absorption. For

TABLE 3

Evaluation of mechanical properties

| Property | | Unit | Testing method | Polyamide compound (bio-polyamide) | | |
|---|---|---|---|---|---|---|
| | | | | PA/BPE Experimental Example 18 | PA/BPE(0.8)/ DPE(0.2) Experimental Example 19 | PA/BPE(0.8)/ NB(0.2) Experimental Example 20 |
| Tensile properties | Modulus of elasticity in tension | MPa | JIS K 7161-2 | 60.0 | 155.0 | 135.0 |
| | Tensile strain at break | % | | 220.0 | 140.0 | 150.0 |
| Flexural properties | Modulus of elasticity in flexure | Mpa | JIS K 7171 | 52.0 | 85.0 | 70.0 |
| Impact properties | Charpy impact strength | kJ/m$^2$ | JIS K 7111-1 | 96.0 | 89.0 | 93.0 |

Table 3 shows the results of Experimental Examples 18, 19, and 20 in order from the left. It was confirmed that any example, it can be used as any member of automobiles, railroad vehicles, ships, aircraft, and the like. For example, it is used as interior materials, exterior material, and the like. Among them, examples of automotive supplies include automotive interior materials, automotive instrument panels, automotive exterior materials, and the like. Specific examples include a door base material, a package tray, a pillar garnish, a switch base, a quarter panel, a side panel, an arm rest, an automotive door trim, a seat structural material, a seat back board, a ceiling material, a console box, an automotive dashboard, various instrument panels, a deck trim, a bumper, a spoiler, a cowling, and the like. Further, examples include interior materials and exterior materials of buildings, furniture, and the like. That is, examples include door surface materials, door structural materials, surface materials for various furniture (desk, chair, shelf, chest of drawers, etc.), and the like. In addition, examples include packages, storage bodies (trays etc.), protective members, partition members, and the like.

The invention claimed is:

1. A polyamide compound comprising:
a dicarboxylic acid unit represented by the following general formula (1) and a diamine unit represented by the following general formula (2):

[Chemical Formula 1]

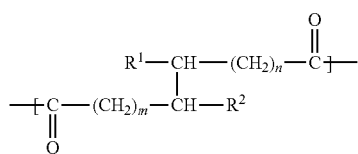

(1)

(wherein n represents 11, and m represents 11; $R^1$ represents $n\text{-}C_9H_{19}$; and $R^2$ represents $n\text{-}C_9H_{19}$);

[Chemical Formula 2]

(2)

(wherein A represents a divalent organic group selected from the following group)

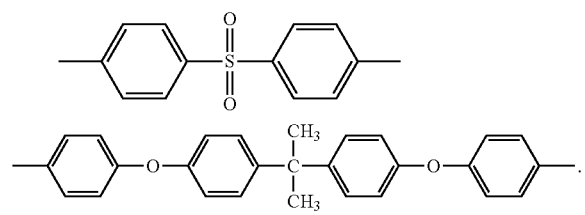

2. The polyamide compound according to claim 1, further comprising:
a diamine unit represented by the following general formula (3):

[Chemical Formula 3]

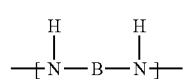

(3)

(wherein B represents a divalent organic group selected from the following group, with the proviso that A and B are different)

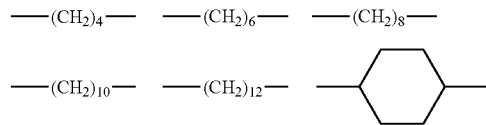

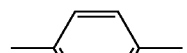

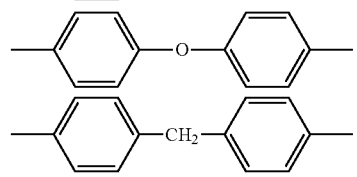

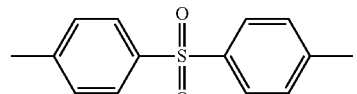

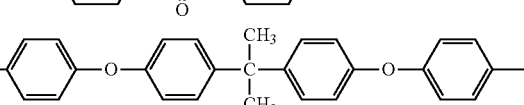

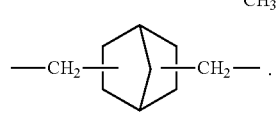

3. The polyamide compound according to claim 1, wherein
A is the following divalent organic group

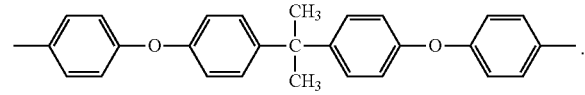

4. The polyamide compound according to claim 2, wherein
A is the following divalent organic group

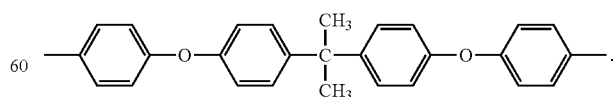

5. A method for producing the polyamide compound as defined in claim 1, comprising reacting a dicarboxylic acid compound having a structure represented by the following general formula (4) with a diamine compound:

[Chemical Formula 4]

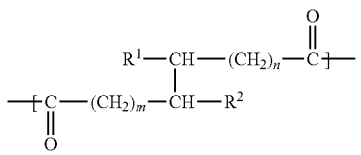
(4)

(wherein n represents 11, and m represents an integer of 11; $R^1$ represents n-$C_9H_{19}$, and $R^2$ represents n-$C_9H_{19}$).

6. A method for producing the polyamide compound as defined in claim 2, comprising reacting a dicarboxylic acid compound having a structure represented by the following general formula (4) with a diamine compound:

[Chemical Formula 4]

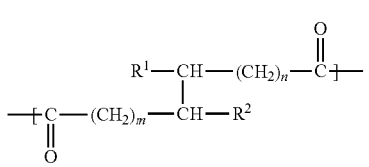
(4)

(wherein n represents 11, and m represents an integer of 11; $R^1$ represents n-$C_9H_{19}$, and $R^2$ represents n-$C_9H_{19}$).

7. A method for producing the polyamide compound as defined in claim 3, comprising reacting a dicarboxylic acid compound having a structure represented by the following general formula (4) with a diamine compound:

[Chemical Formula 4]

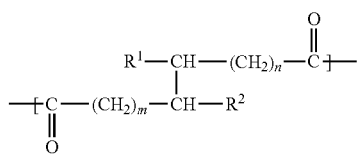
(4)

(wherein n represents 11, and m represents an integer of 11; $R^1$ represents n-$C_9H_{19}$, and $R^2$ represents n-$C_9H_{19}$).

* * * * *